United States Patent
Pfaender et al.

(10) Patent No.: US 8,577,349 B2
(45) Date of Patent: Nov. 5, 2013

(54) METHOD OF DECODING, CORRESPONDING TERMINAL AND COMPUTER PROGRAM, METHOD OF TRANSLATION, CORRESPONDING SERVER AND COMPUTER PROGRAM

(75) Inventors: Laetitia Pfaender, Compiegne (FR); Bertrand Audinet, Margny les Compiegne (FR); Philippe Lafoucriere, Roberval (FR); Jean-Claude Dufourd, Le Kremin Bicetre (FR)

(73) Assignee: Streamezzo, Paris (FR)

( * ) Notice: Subject to any disclaimer, the term of this patent is extended or adjusted under 35 U.S.C. 154(b) by 592 days.

(21) Appl. No.: 12/810,508

(22) PCT Filed: Dec. 23, 2008

(86) PCT No.: PCT/EP2008/068235
§ 371 (c)(1),
(2), (4) Date: Dec. 17, 2010

(87) PCT Pub. No.: WO2009/083554
PCT Pub. Date: Jul. 9, 2009

(65) Prior Publication Data
US 2011/0117940 A1 May 19, 2011

(30) Foreign Application Priority Data
Dec. 24, 2007 (FR) ...................................... 07 60349

(51) Int. Cl.
*H04L 29/08* (2006.01)
(52) U.S. Cl.
USPC ........................................................ 455/414.4
(58) Field of Classification Search
USPC ........................................................ 455/414.4
See application file for complete search history.

(56) References Cited

U.S. PATENT DOCUMENTS

| | | | |
|---|---|---|---|
| 5,528,025 A * | 6/1996 | Swintek | 235/462.46 |
| 8,238,885 B2 | 8/2012 | Mueller et al. | |
| 2004/0099741 A1 | 5/2004 | Dorai et al. | 235/462.08 |
| 2005/0031092 A1* | 2/2005 | Umemura et al. | 379/88.13 |
| 2005/0044179 A1* | 2/2005 | Hunter | 709/218 |
| 2005/0286493 A1 | 12/2005 | Angelhag | 370/352 |
| 2008/0125162 A1 | 5/2008 | Schraven et al. | 455/550.1 |
| 2009/0291671 A1 | 11/2009 | Mueller et al. | |

FOREIGN PATENT DOCUMENTS

| | | | | |
|---|---|---|---|---|
| DE | 10 2005 010 146 A1 | 4/2006 | | |
| GB | 2 354 360 | 3/2001 | ............... | G06K 7/10 |

OTHER PUBLICATIONS

Written Opinion from International Application No. PCT/EP2008/068235 received Jun. 24, 2010 from www.wipo.int.

(Continued)

*Primary Examiner* — Marisol Figueroa
(74) *Attorney, Agent, or Firm* — Zilka-Kotab, PC

(57) ABSTRACT

The invention relates to a method of decoding at least one image of a physical object as an action executable by a mobile terminal. According to the invention, such a method comprises the following steps: establishment of a bidirectional communication between said terminal and a translation server, said establishment step comprising the following sub-steps: capture of said image or images of said physical object by said terminal; transmission, from said terminal to said translation server, of said image or images captured; reception, by said terminal, of at least one item of information representative of an action executable by said terminal, termed the action information, and corresponding to a decoding, by said translation server, of said image or images transmitted.

19 Claims, 2 Drawing Sheets

(56) References Cited

OTHER PUBLICATIONS

Figure 1:
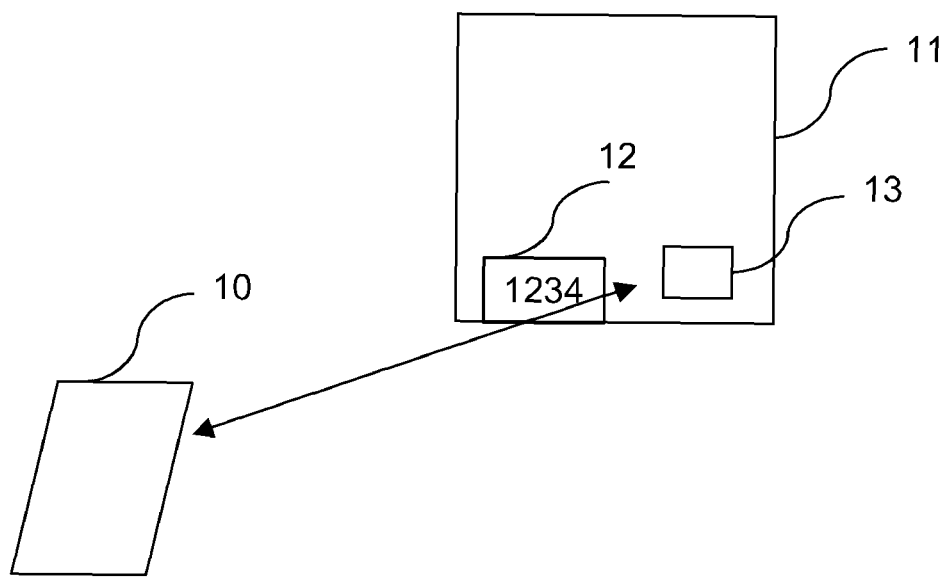

International Search Report from International Application No. PCT/EP2008/068235 dated Apr. 28, 2009.
European International Preliminary Examination Report from Application No. PCT/EP2008/068235 mailed Jun. 29, 2010.
Preliminary Research Report from French Patent Application No. 0760349, dated Sep. 16, 2008.
Office Action from Chinese Patent Application No. 200880122704.9, dated Jan. 4, 2013.
Office Action from Chinese Patent Application No. 200880122704.9, dated Mar. 20, 2012.

* cited by examiner

METHOD OF DECODING, CORRESPONDING TERMINAL AND COMPUTER PROGRAM, METHOD OF TRANSLATION, CORRESPONDING SERVER AND COMPUTER PROGRAM

CLAIM FOR PRIORITY

The present application claims the priority of a French Patent Application filed Dec. 24, 2007 under application number 0760349, which is incorporated herein by reference.

FIELD OF THE INVENTION

The field of the invention is that of translating, or decoding, a physical object as an action.

The invention refers more particularly to the translation of a two dimensional bar code type physical object as an action that may be executed by a mobile terminal.

PRIOR ART

A two dimensional bar code, still known as a "2D bar code", allows a certain number of items of information to be stored, which, when they are decoded, allow a certain number of associated actions to be implemented.

For example, an item of information may contain an address, in the form of a URL (Uniform Resource Locator), of an internet site that is accessible by a mobile or a WAP (Wireless Application Protocol) site, and an associated action may consist of sending an SMS (short text message) containing the URL.

Currently, there are a number of different formats of two dimensional bar codes, including: the Maxicode, the Data-Matrix, the PDF4173 or the Quick Response code, known as the QR Code.

The latter has the advantage of having the capacity of stocking a lot of information whilst also being short and quick to scan. It may be used in a wide range of applications intended for the general public, advertising, the traceability of foodstuffs or the payment of services. It may consequently be found in magazines, in adverts, in brochures, town maps, exhibitions or even on foodstuffs.

The QR code stores data horizontally and vertically, and may contain a lot more information than a traditional bar code (or one dimensional bar code), whilst taking up less space.

For example, on a mobile telephone, such a 2D bar code may be read from a photo or a video by means of a specific application that is downloaded and installed on the terminal.

This application analyses the photograph, or the video, of the 2D bar code and then decodes the information contained in the bar code.

Once this information has been decoded, the specific application may either process it directly, for example by opening a WAP site corresponding to a URL contained in coded form in the bar code, or send it to an external server that is able to process the information and to implement the associated action.

The specific application may also simply transmit the image, or the video, of the bar code to an external server, which will decode it and implement the associated action.

One disadvantage of this technique of the prior art is that it necessitates the downloading and installation of a specific application, which allows at least the 2D bar code to be read or even decoded on the user terminal.

Furthermore, certain of these specific applications are incompatible with different types of 2D bar codes, thus necessitating the download of several different applications to a same terminal in order to be able to read several different types of 2D bar codes.

Another disadvantage of this technique of the prior art, in the case where the application downloaded to decode the 2D bar code is housed on an external server, lies in the fact that this application is only used once the image, or the video, of the bar code is obtained by the user terminal. Consequently there is no interaction when the image of the bar code is taken. Therefore the quality of the image, or the video, of the bar code is not checked before it is sent to the decoding application.

For example, in the case of a specific application that reads the image and then transmits this image to an external server to be decoded, poor image quality is only detected at the external server, which informs the reading application that the quality of the image does not allow it to be decoded. The reading application in turn informs the user, who must then obtain a new image, which the reading application must again read before sending it to the external server which decodes it. In this case, the reading and decoding of a 2D bar code, as well as the implementation of the corresponding action, requires a relatively long time, which penalises the user.

Finally, any downloaded application may read a certain number of code types which exist when the application is created. If new types of code are subsequently created, a new application which is able to decode these new types must be downloaded, to replace or complement the application that has already been downloaded.

PURPOSES OF THE INVENTION

The principal purpose of the invention is to overcome these disadvantages of the prior art.

More precisely, one purpose of the invention, according to at least one embodiment, is to propose a technique for translating a physical object into an action that may be executed by a user terminal, which does not require the prior downloading of a specific application onto the user terminal.

Another purpose of the invention, according to at least one embodiment, is to propose such a technique that is simple and cheap to implement and which has better performances in terms of the time required to implement the action to be executed by the user terminal and in terms of user ergonomics.

Another purpose of the invention is to provide a technique that is not sensitive to the changes in the types of coding used for the physical object.

The invention also has for purpose to reduce the return time of the capture of an image of the physical object.

DESCRIPTION OF THE INVENTION

The invention proposes a novel solution which does not present the disadvantages of the prior art, in the form of a method for decoding at least one image of a physical object as an action that may be executed by a mobile terminal.

According to the invention, such a method comprises the following steps:
  the establishing of a bidirectional communication between said terminal and a translation server, wherein said establishing step comprises the following sub-steps:
  the capture of said image(s) of said physical object by said terminal;
  the transmission, from said terminal to said translation server, of said image(s) captured;

the reception, by said terminal, of at least one item of information that is representative of an action that may be executed by said terminal, called the action information, and which corresponds to a translation of said image(s) transmitted.

Consequently, the invention is based on a novel and inventive approach of the decoding of an image of a physical object into an action that may be executed by a mobile terminal, which does not require the prior downloading and installation of a specific application on the terminal in question.

The method according to the invention thus permits an improvement in the execution of an action resulting from the decoding of a physical object, by a mobile terminal.

A physical object may be for example a bar code, permitting an item of information to be encoded which associates one or several actions to be executed on the terminal having read the bar code.

For example, an item of action information according to the invention may be a URL corresponding to an address for downloading a software program, as well as the installation instructions for the software, a code to activate a software program, a code which corresponds to a commercial promotion, a password to access an internet site, a URL of a content (for example a film trailer), etc.

The method according to the invention also permits interactivity in the capture of the image(s) of the physical object, by establishing a bidirectional communication with a translation server, which is notably responsible for receiving this/these captured image(s).

According to one specific characteristic of the invention, the step for establishing the bidirectional communication comprises a sub-step for receiving, by said terminal, an item of information for the termination of said bidirectional communication if said image(s) received by said translation server are validated.

Thus, the method according to the invention allows a verification to be made in real time of the quality of the image(s) captured. Indeed, the translation server responsible for receiving and then processing the captured image(s) of the physical object, verifies the quality of the image(s) received so as to use them correctly thereafter. The translation server terminates the bidirectional communication and sends a message to confirm the termination of this communication to the mobile terminal once the image of the physical object has been read and decoded.

According to one specific embodiment, the bidirectional communication is a video phone communication.

Thus, the mobile terminal directly transmits the image(s) of the physical object via a video phone communication. Most of the current mobile terminals have a video phone communication function, so the establishing of this communication does not require any prior action on the terminal contrary to the prior art where the downloading and installation of an application were required.

Furthermore, a video phone communication offers interactivity when the images of the physical object are captured, between the translation server and the terminal which captures the images.

In particular, the step of establishing this bidirectional communication comprises a sub-step of receiving, by said terminal, at least one item of information to assist in the capture of said image(s).

Consequently, the terminal captures the image(s) during the bidirectional communication with the translation server and may thus receive indications on the taking of the images from the server.

Indeed, the server analyses in real time the quality of the images captured by the terminal and if the images are not of sufficiently good quality, the translation server may send the terminal information which allow it to correct and improve the quality of the images taken, in real time.

For example, the terminal may receive indications to re-centre its sensor onto the physical object, or indications requesting it to move further away or closer to the physical object, etc.

The method according to the invention thus permits a considerable reduction in the feedback time for poor image quality, by adjusting the capture of the images in real time.

According to one specific embodiment, the physical object is a bar code.

Indeed, a bar code, notably a two dimensional bar code, allows information to be encoded in several dozen characters and thus makes possible a large number of associated actions.

For example, an item of action information belongs to the group comprising:
an address of a mobile site;
an SMS;
a telephone number;
an Email address;
a text;
a identifier providing access to another item of information.

The invention also relates to a computer program that may be downloaded from a communication network and/or saved onto a support that may be read by a computer and/or executed by a processor, comprising program code instructions for the implementation of the decoding method previously described.

Another aspect of the invention concerns a mobile terminal.

According to the invention, such a terminal comprises:
means of establishing a bidirectional communication between said terminal and a translation server, wherein said means of establishing comprise:
means of capturing said image(s) of said object;
means of transmitting, to said translation server, said captured image(s);
means of receiving at least one item of information that is representative of an action that may be executed, called the action information, and which corresponds to a translation of said image(s) transmitted.

Such a terminal is notably capable of implementing the decoding method previously described.

The invention also concerns a method for translating at least one image of a physical object into an action that may be executed by a mobile terminal.

According to the invention, such a translation method comprises the following steps:
reception of said image(s) of the physical object;
translation of said image(s) received into at least one item of information that is representative of an action that may be executed by said terminal, called the action information;
transmission of said at least one item of action information to said mobile terminal.

Thus, the translation method according to the invention allows one or several images of a physical object to be translated into at least one item of information that is representative of an action that may be executed on the terminal which emits the images.

The action information is then transmitted to the mobile terminal, so that it may execute the action associated to the physical object.

Such action information is for example transmitted in the form of an SMS comprising a URL and information for the installation of software available via the URL in question.

According to one specific characteristic, the method of translation comprises a step of transmitting at least one item of information to assist in the capture of said image(s).

Consequently, the method of translation is able to assist the terminal in the capture of images, by transmitting to the terminal information to assist with the capture, such as information on the orientation of the sensor, information on the parameter settings of the sensor, etc. The method thus allows the images received from the mobile terminal to be validated in real time.

According to one specific embodiment of the invention, the translation step comprises the following sub-steps:

the reading of said image(s) received;

the decoding of said image(s) read, providing said at least one item of action information.

Consequently, the translation step consists firstly of reading the image received then decoding it, using the suitable application. The reading and decoding of the image read may be implemented on a same server, called the translation server, or by two separate servers, wherein the first reads the images and transmits the images read to a second server, which comprises the decoding application, and which carries out the actual decoding of the images read.

Furthermore, as previously indicated, the translation method according to the invention comprises a step for validating said image(s) received.

The invention also relates to a server for translating a physical object into an action that may be executed by a mobile terminal, comprising:

means of receiving said image(s) of said physical object;

means of decoding said image(s) received, providing at least one item of information that is representative of an action that may be executed by said terminal, called action information;

means of transmitting said at least one item of action information to said mobile terminal.

Such a server is notably capable of implementing the translation method previously described.

Finally, the invention relates to a computer program that may be downloaded from a communication network and/or saved onto a support that may be read by a computer and/or executed by a processor, comprising program code instructions for the implementation of the decoding method previously described.

LIST OF FIGURES

Figure 2:
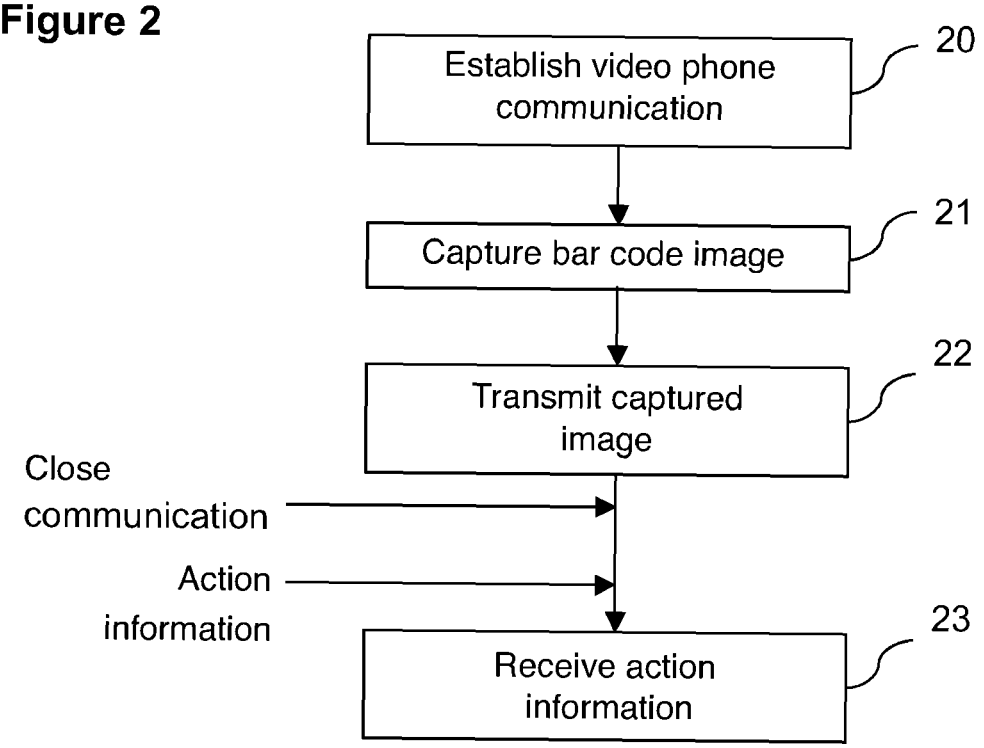
Figure 3:
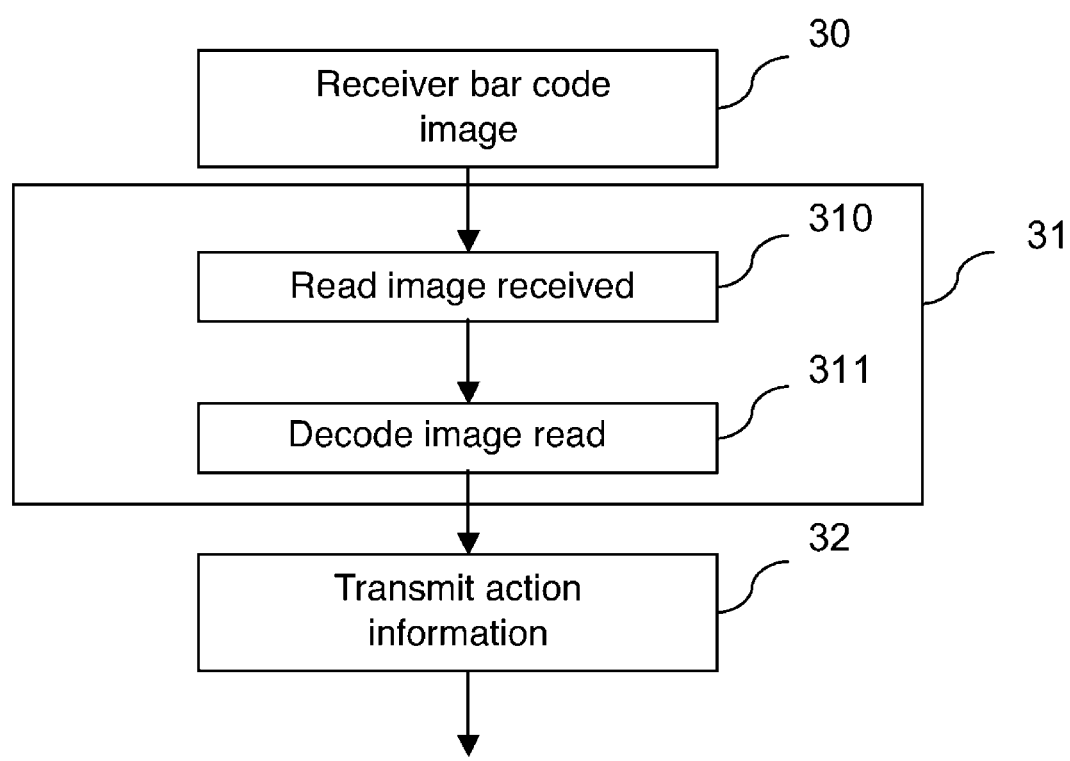

Other characteristics and advantages of the invention will become clearer upon reading the following description of a specific embodiment, provided purely by way of illustration and non restrictively, and the appended drawings, wherein:

FIG. 1 illustrates an example of a system in which the method is implemented according to one embodiment of the invention;

FIG. 2 presents the main steps of the method of decoding according to one embodiment in a system such as that illustrated in FIG. 1;

FIG. 3 presents the main steps of the method of translation according to one embodiment in a system such as that illustrated in FIG. 1.

DESCRIPTION OF AN EMBODIMENT OF THE INVENTION

1. General Principle

The general principle of the invention is based on establishing a bidirectional communication to transmit one or several images, or a video, of a physical object, for example a two dimensional bar code, to a server, which then decodes the physical object and implements the associated action.

Thus, the invention according to at least one embodiment, avoids having to download and then install a specific application for reading and/or decoding a physical object, in order to be able to implement the action associated to the information contained in this physical object.

For example, the bidirectional communication is of the video phone communication type.

2. Description of an Embodiment

In relation to FIG. 1, an example of an embodiment of the invention is presented, as a non restrictive example.

A 2D bar code type physical object 13 is considered, which is present on a poster 11, for example in the street, displaying an advertisement for an advertiser. This 2D bar code permits a user so wishing, by reading and decoding it, to access for example an interne site of the advertiser, in order to be able to purchase on line the product(s) presented on the poster, or to be able to download a specific software program, such as a mobile application.

Examples of the use of 2D bar codes on posters are described below. For example, a poster may be considered which announces the forthcoming release of a new film. In one corner of the poster, a 2D bar code is displayed, and scanning it permits the multimedia scanner of the mobile telephone to be redirected to a site permitting the trailer of the film to be downloaded.

In another example, a poster advertises the sales period for a store, which has a 2D bar code in a corner which when scanned will redirect to a mobile internet site where the user will receive a code to collect a gift, or obtain extra discount, or any other type of sales promotional operation.

The poster also contains a short number 12, which permits access to a dedicated video phone server.

According to the invention, the user uses his/her mobile terminal 10, for example a mobile telephone, to capture one or several images (for example in the form of a video), via a sensor such as a camera for example, of the 2D bar code 13. It is supposed that the terminal 10 of the user has a video phone communication function, which is the case for the vast majority of current mobile terminals.

Now, in relation to FIG. 2, the main steps of the decoding method are presented, implemented in the mobile terminal 10, according to this embodiment of the invention.

Initially, the user dials the short number 12 of the video phone server, in order to establish a communication with this server in a step 20. Once the communication has been established, the server sends instructions to the user, to capture one or several images of the 2D bar code.

In this example, it is considered that the server requires a static image, or a photograph, of the 2D bar code.

For example, the instructions from the server may be in the form of a video comprising a text asking the user to position the camera of his/her terminal in front of the 2D bar code. The instructions may also be sent to the user in the form of a voice message.

During a step 21, the user positions his/her terminal so as to obtain an image of the 2D bar code, possibly by following instructions from the server to obtain an image of satisfactory quality that may be used. Therefore, if the image obtained by the terminal is not good enough, the server can replace the first instructions message by a second message asking the user to reposition the camera and to take another photo of the 2D bar code. For example, the user may be asked to move the terminal closer or further away, to change the angle, to adjust the brightness, to adjust the code scan speed if this involves a video, etc.

The user is thus interactively assisted in real time to obtain an image of the 2D bar code that may be used.

If it is not possible to obtain an image of a quality that may be used, the server may break the communication. In this case, the terminal 10 is informed that the communication has been terminated.

The server translates the image obtained, either by calling on a separate server, so as to obtain the information contained in the 2D bar code, as well as the action associated to the 2D bar code that may be executed by the mobile terminal. This translation is described in detail below, in relation to FIG. 3.

Once the action information has been obtained, the video phone server interrupts the communication with the user's terminal.

The user's terminal receives the action information, in a step 23, and asks the user to execute the corresponding action.

Thus, the user does not need to download a specific application to read and decode the 2D bar code. The user simply uses the video phone function of his/her terminal, to call a video phone server, which then reads, decodes and transmits in return to the terminal the action associated to the 2D bar code (described below in relation to FIG. 3).

Furthermore, the user of the terminal is also assisted in taking the photo of the 2D bar code, in order to secure its scanning and decoding, and thus optimise the time between when the image of the 2D bar code is obtained and the execution itself of the associated action.

Now in relation to FIG. 3, the main steps of the method of translation are presented, implemented by the video phone server that is accessible using the short number 12.

In a first step, the server receives, in our example from the terminal 10, an image of the 2D bar code 13.

As previously stated, this reception step may include several sub-steps during which the quality of the image received by the server is verified, in order to validate that the image received may indeed be used by the server. Consequently, this reception step may especially comprise one or several steps of the transmission of information to the mobile terminal to assist in capturing the images.

Once the server has received an image of sufficient quality, it translates it in a step 31, so as to obtain an item of action information, as described above.

This translation step may include two sub-steps:
a sub-step 310 of reading the image;
a sub-step 311 of decoding the image read.

These two sub-steps of reading 310 and decoding 311 may be implemented by the video phone server itself or via a separate server.

For example the video phone server may comprise means of reading an image of a bar code and means of transmitting this read image to another server, which has the capacity of decoding the image. Or again, the video phone server may transmit the image as it receives it to another server which reads and decodes the image.

At the end of this decoding sub-step 311, an item of information that is representative of an action associated to the 2D bar code is obtained.

Based on this information, the server may implement the associated item(s) of action information, which are then intended to be executed by the mobile terminal 10.

The server thus transmits the action information in a step 32, to the terminal 10. For example, the information obtained may correspond to a whole number, with 64 bit encoding, which acts as an index in a URL table. In this case, the server sends the terminal 10, for example via an SMS type message, the URL corresponding to the decoded whole number. This URL may correspond for example to an address of a mobile site from which a specific mobile application may be downloaded. In this case, the SMS may also contain, in addition to the URL, a set of instructions concerning the installation of this mobile application, available at the address corresponding to the URL.

The terminal of the user receives the SMS and asks the user to install the application in question.

The method of decoding according to this embodiment of the invention this permits a user of a mobile terminal to execute an action associated to a 2D bar code of which an image has been obtained by the mobile terminal in question, without downloading or installing beforehand any specific application to translate the 2D bar code into an action that may be executed on the terminal.

The invention claimed is:

1. A method, comprising:
establishing a bidirectional communication between a mobile terminal and a translation server, wherein said establishing comprises:
capturing at least one first image of a physical object by said mobile terminal utilizing a sensor;
transmitting said captured at least one first image of said physical object from said mobile terminal to said translation server;
receiving, by said mobile terminal from said translation server in response to said translation server receiving said captured at least one first image of said physical object, at least one indication to relocate said sensor utilized by said mobile terminal to capture said at least one first image of said physical object;
relocating, by said mobile terminal, said sensor according to said at least one indication received from said translation server;
capturing at least one second image of said physical object by said mobile terminal utilizing said relocated sensor;
transmitting said ca tarred at least one second image of said physical object from said mobile terminal to said translation server; and
receiving, by said mobile terminal, at least one item of action information that is representative of an action executable by said mobile terminal, and which corresponds to a translation of said transmitted at least one second image of said physical object.

2. The method according to claim 1, wherein said establishing further comprises receiving, by said mobile terminal, an item of information for a termination of said bidirectional communication if said at least one second image of said physical object received by said translation server is validated.

3. The method according to claim 1, wherein said bidirectional communication is a video phone communication.

4. The method according to claim 1, wherein said physical object is a bar code.

5. The method according to claim 1, wherein said action information includes at least one of an address of a mobile site, an SMS, a telephone number, an Email address, a text, and an identifier providing access to another item of information.

6. The method according to claim 1, wherein said at least one indication to relocate said sensor utilized by said mobile terminal is sent to said mobile terminal based on said translation server analyzing in real-time said at least one first image of said physical object received from said mobile terminal.

7. The method according to claim 1, wherein said at least one indication to relocate said sensor utilized by said mobile terminal includes information on a parameter setting of said sensor.

8. The method according to claim 1, wherein said establishing of said bidirectional communication between said mobile terminal and said translation server further includes said mobile terminal dialing a telephone number that permits access to said translation server prior to said mobile terminal capturing said at least one first image.

9. A computer program embodied on a non-transitory computer readable medium, comprising:
   computer code for establishing a bidirectional communication between a mobile terminal and a translation server, wherein said computer code for establishing comprises:
      computer code for capturing at least one first image of a physical object by said mobile terminal utilizing a sensor;
      computer code for transmitting said captured at least one first image of said physical object from said mobile terminal to said translation server;
      computer code for receiving, by said mobile terminal from said translation server in response to said translation server receiving said captured at least one first image of said physical object, at least one indication to relocate said sensor utilized by said mobile terminal to capture said at least one first image of said physical object;
      computer code for capturing at least one second image of said physical object by said mobile terminal utilizing said sensor after said sensor is relocated;
      computer code for transmitting said captured at least one second image of said physical object from said mobile terminal to said translation server; and
      computer code for receiving, by said mobile terminal, at least one item of action information that is representative of an action executable by said mobile terminal, and which corresponds to a translation of said transmitted at least one second image of said physical object.

10. The computer program according to claim 9, wherein said computer code for establishing further comprises computer code for receiving, by said mobile terminal, an item of information for a termination of said bidirectional communication if said at least one second image of said physical object received by said translation server is validated.

11. The computer program according to claim 9, wherein said bidirectional communication is a video phone communication.

12. The computer program according to claim 9, wherein said physical object is a bar code.

13. The computer program according to claim 9, wherein said action information includes at least one of an address of a mobile site, an SMS, a telephone number, an Email address, a text, and an identifier providing access to another item of information.

14. A mobile terminal, comprising:
    means for establishing a bidirectional communication between a mobile terminal and a translation server, wherein said establishing means comprises:
       means for capturing at least one first image of a physical object utilizing a sensor;
       means for transmitting said captured at least one first image of said physical object to said translation server;
       means for receiving, from said translation server in response to said translation server receiving said captured at least one first image of said physical object from said mobile terminal, at least one indication to relocate said sensor utilized by said mobile terminal to capture said at least one first image of said physical object;
       means for capturing at least one second image of said physical object by said mobile terminal utilizing said sensor after said sensor is relocated;
       means for transmitting said captured at least one second image of said physical object to said translation server; and
       means for receiving at least one item of action information that is representative of an action executable by said mobile terminal, and which corresponds to a translation of said transmitted at least one second image of said physical object.

15. A method, comprising:
    receiving, from a mobile terminal by a translation server, at least one first image of a physical object, where said at least one first image of said physical object is captured by said mobile terminal utilizing a sensor;
    transmitting, to said mobile terminal from said translation server in response to receiving said at least one first image of said physical object, at least one indication to relocate said sensor utilized by said mobile terminal to capture said at least one first image;
    receiving, from said mobile terminal by said translation server, at least one second image of said physical object, where said at least one second image of said physical object is captured by said mobile terminal utilizing said relocated sensor;
    translating said received at least one second image of said physical object into at least one item of action information that is representative of an action executable by said mobile terminal; and
    transmitting said at least one item of action information to said mobile terminal.

16. The method according to claim 15, wherein said translation comprises:
    reading said received at least one second image of said physical object;
    decoding said read at least one second image of said physical object;
    providing said at least one item of action information.

17. The method according to claim 15, wherein said received at least one second image of said physical object is validated.

18. A server, comprising:
    means for receiving, from a mobile terminal, at least one first image of a physical object, where said at least one first image of said physical object is captured by said mobile terminal utilizing a sensor;
    means for transmitting, to said mobile terminal from said translation server in response to receiving said at least one first image of said physical object, at least one indication to relocate said sensor utilized by said mobile terminal to capture said at least one first image;
    means for receiving, from said mobile terminal by said translation server, at least one second image of said physical object, where said at least one second image of said physical object is captured by said mobile terminal utilizing said relocated sensor;

means for translating said received at least one second image of said physical object into at least one item of action information that is representative of an action executable by said mobile terminal; and means for transmitting said at least one item of action information to said mobile terminal.

19. A computer program embodied on a non-transitory computer readable medium, comprising:

computer code for receiving, from a mobile terminal, at least one first image of a physical object, where said at least one first image of said physical object is captured by said mobile terminal utilizing a sensor;

computer code for transmitting, to said mobile terminal from said translation server in response to receiving said at least one first image of said physical object, at least one indication to relocate said sensor utilized by said mobile terminal to capture said at least one first image;

computer code for receiving, from said mobile terminal by said translation server, at least one second image of said physical object, where said at least one second image of said physical object is captured by said mobile terminal utilizing said relocated sensor;

computer code for translating said received at least one second image of said physical object into at least one item of action information that is representative of an action executable by said mobile terminal; and computer code for transmitting said at least one item of action information to said mobile terminal.

* * * * *

UNITED STATES PATENT AND TRADEMARK OFFICE
CERTIFICATE OF CORRECTION

PATENT NO. : 8,577,349 B2
APPLICATION NO. : 12/810508
DATED : November 5, 2013
INVENTOR(S) : Laetitia Pfaender et al.

Page 1 of 1

It is certified that error appears in the above-identified patent and that said Letters Patent is hereby corrected as shown below:

In The Claims

At column 8, claim number 1, line number 45; please replace "ca tarred" with --captured--.

Signed and Sealed this
Twenty-ninth Day of March, 2016

Michelle K. Lee
*Director of the United States Patent and Trademark Office*